Figure 1:
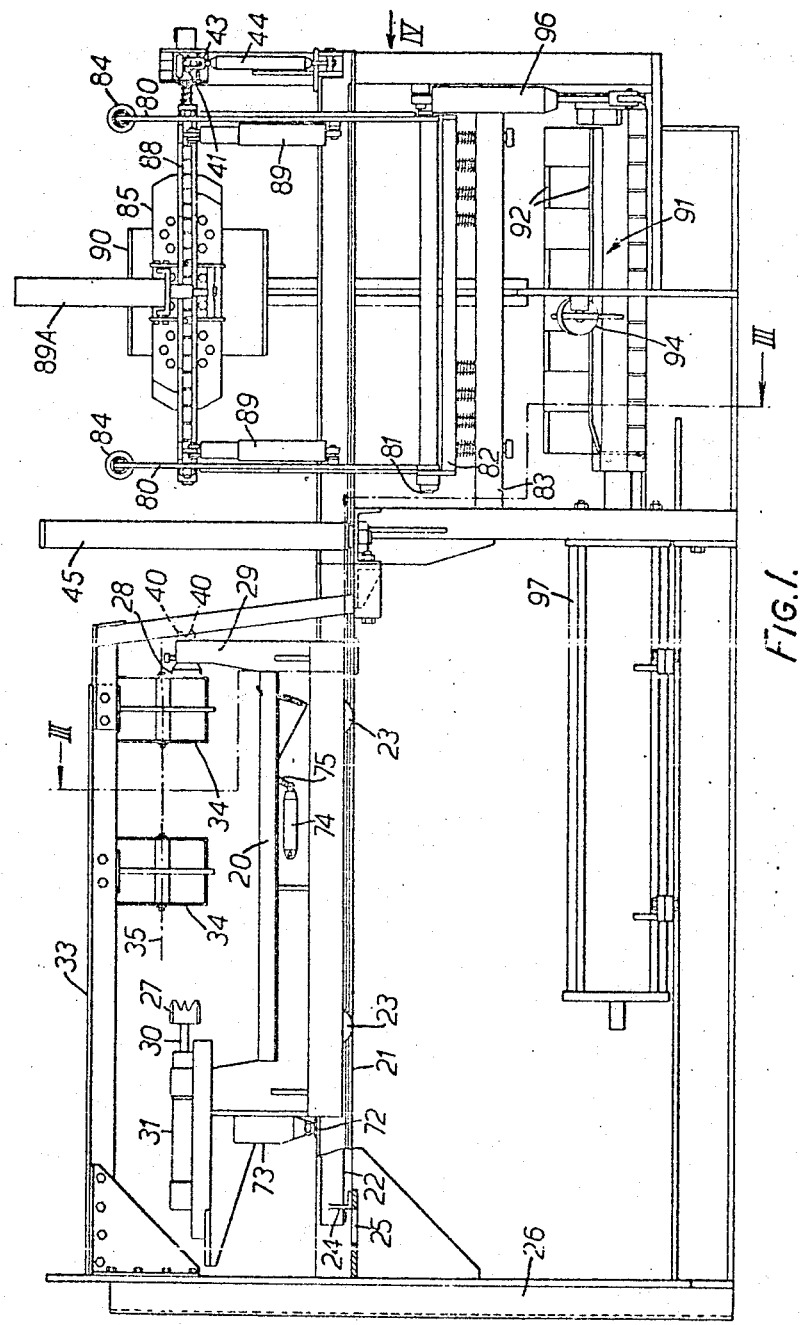

Dec. 27, 1966    F. H. BUCKLEY    3,293,734
MACHINES FOR REMOVING SPLITTER BLADES FROM
NUCLEAR REACTOR FUEL CANS
Filed Dec. 13, 1963    13 Sheets-Sheet 1

INVENTOR
FRANK H BUCKLEY

BY
ATTORNEY

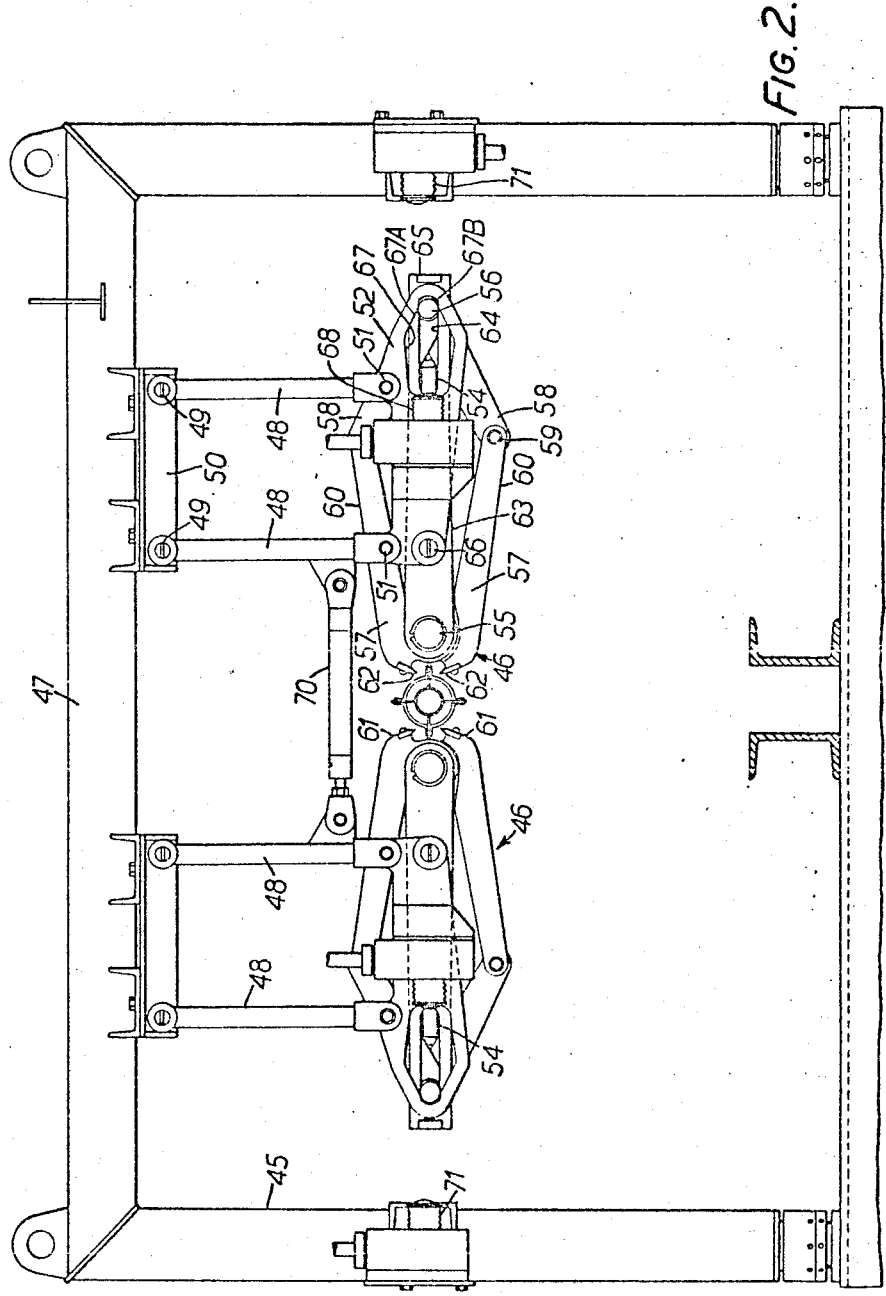

Dec. 27, 1966  F. H. BUCKLEY  3,293,734
MACHINES FOR REMOVING SPLITTER BLADES FROM
NUCLEAR REACTOR FUEL CANS
Filed Dec. 13, 1963  13 Sheets-Sheet 3
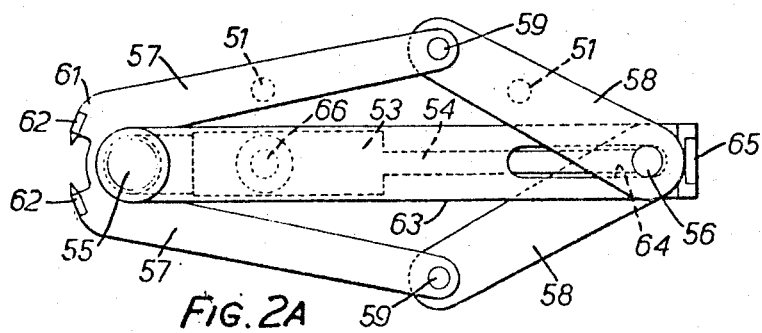
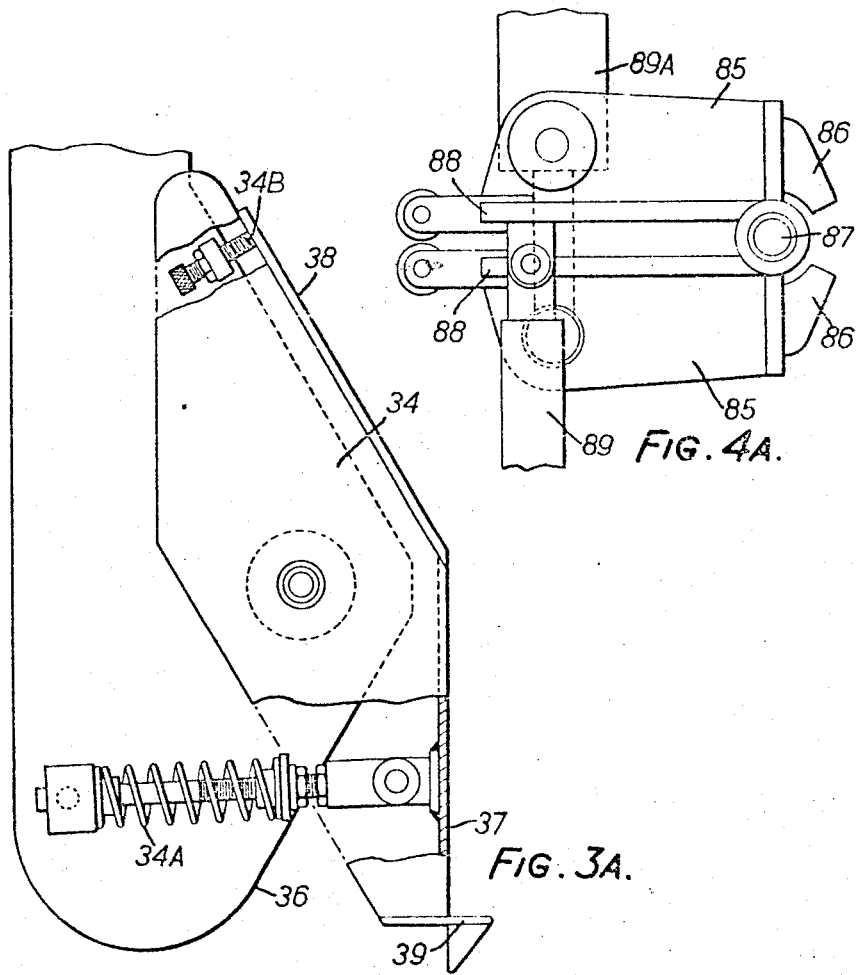
INVENTOR
FRANK HOLLINS BUCKLEY
BY
ATTORNEY Dec. 27, 1966  F. H. BUCKLEY  3,293,734
MACHINES FOR REMOVING SPLITTER BLADES FROM
NUCLEAR REACTOR FUEL CANS
Filed Dec. 13, 1963  13 Sheets-Sheet 5

INVENTOR
FRANK H. BUCKLEY

BY
ATTORNEY

Dec. 27, 1966  F. H. BUCKLEY  3,293,734
MACHINES FOR REMOVING SPLITTER BLADES FROM
NUCLEAR REACTOR FUEL CANS
Filed Dec. 13, 1963  13 Sheets-Sheet 6

INVENTOR
FRANK H. BUCKLEY

BY

ATTORNEYS

Dec. 27, 1966   F. H. BUCKLEY   3,293,734
MACHINES FOR REMOVING SPLITTER BLADES FROM
NUCLEAR REACTOR FUEL CANS
Filed Dec. 13, 1963   13 Sheets-Sheet 7

INVENTOR
FRANK H. BUCKLEY

BY
ATTORNEY

Dec. 27, 1966    F. H. BUCKLEY    3,293,734
MACHINES FOR REMOVING SPLITTER BLADES FROM
NUCLEAR REACTOR FUEL CANS
Filed Dec. 13, 1963    13 Sheets-Sheet 8

INVENTOR
FRANK H. BUCKLEY

BY
ATTORNEY

Dec. 27, 1966   F. H. BUCKLEY   3,293,734
MACHINES FOR REMOVING SPLITTER BLADES FROM
NUCLEAR REACTOR FUEL CANS
Filed Dec. 13, 1963   13 Sheets-Sheet 9

INVENTOR
FRANK H. BUCKLEY

BY
ATTORNEYS

Dec. 27, 1966   F. H. BUCKLEY   3,293,734
MACHINES FOR REMOVING SPLITTER BLADES FROM
NUCLEAR REACTOR FUEL CANS
Filed Dec. 13, 1963   13 Sheets-Sheet 10

INVENTOR
FRANK H. BUCKLEY

BY
ATTORNEYS

INVENTOR
FRANK H. BUCKLEY

ATTORNEY

Dec. 27, 1966            F. H. BUCKLEY            3,293,734
MACHINES FOR REMOVING SPLITTER BLADES FROM
NUCLEAR REACTOR FUEL CANS
Filed Dec. 13, 1963            13 Sheets-Sheet 12

INVENTOR
FRANK HOLLINS BUCKLEY

BY Watson Cole Grindle & Watson

ATTORNEY

United States Patent Office 3,293,734
Patented Dec. 27, 1966

3,293,734
MACHINES FOR REMOVING SPLITTER BLADES FROM NUCLEAR REACTOR FUEL CANS
Frank H. Buckley, Heston, England, assignor to Fairey Engineering Limited, Heston, England, a company of Great Britain
Filed Dec. 13, 1963, Ser. No. 330,354
10 Claims. (Cl. 29—200)

This invention relates to a machine for automatically performing a predetermined sequence of operations designed to remove from a used fuel can of a nuclear reactor an assembly of longitudinal "splitter" blades which is secured to the exterior of the fuel can. Such a splitter blade assembly comprises a group of two or more pairs of diametrically-opposed, radially-projecting longitudinal blades disposed lengthwise of the fuel can outside the circular or helical heat-exchange fins of the fuel can. The splitter blades are let into radial grooves formed in the heat-exchange fins and are secured together by securing means which may comprise metal straps extending around the outer edges of the heat-exchange fins between adjacent splitter blades, each strap being rivetted or otherwise secured at its two ends to the adjacent splitter blades.

When a used fuel can is removed from the core of a nuclear reactor, it is necessary to remove the used fuel elements from its interior and to dismantle the can for processing to remove contaminants prior to its being reconditioned for reuse, and as a first step in the dismantling of the can the assembly of stripper blades has to be removed from around the can. As the fuel can and the stripper blade assembly will be radioactive when removed from the core of the nuclear reactor, the handling of the can and the removal from it of the splitter blade assembly has to be done mechanically and by remote control, and an object of the present invention is to provide a suitable machine for automatically dismantling a succession of used fuel cans supplied to it by a suitable manipulator, which preferably also compacts the waste splitter blades removed from the cans.

The present invention consists broadly in a machine for stripping splitter blades from a nuclear reactor fuel can assembly, said blades extending longitudinally of the can and generally radially outwardly therefrom, and secured to the can by at least one strap which extends substantially circumferentially around said can and blade assembly, and which has end portions extending radially of the can, said machine comprising; a can assembly support carriage; means for angularly orientating said can assembly about its longitudinal axis relative to said carriage; power-operated cutting means adjacent said carriage adapted to sever the radial portions of said strap to free at least one splitter blade; power-operated blade withdrawal means adapted to grip the freed splitter blade and withdraw it radially from said can assembly; means to relatively position said can assembly, said cutting means and said blade withdrawal means; and remote control means for sequentially controlling the operation of the machine whereby the splitter blades may be removed by a remotely controlled sequence of operations.

In one form of the invention the cutter mechanism is arranged to sever in a single operative pass all the sets of strap securing means associated with two diametrically-opposed splitter blades of the splitter assembly, and the withdrawal mechanism is arranged to grip both the said two diametrically-opposed blades and to withdraw them both simultaneously in radially outward directions under the control of the control mechanism.

Conveniently the support means is guided for longitudinal movement along a predetermined path, and the cutter mechanism and withdrawal mechanism are spaced apart from one another at separate stations along the said path. The control means may be operable to actuate the cutter mechanism and the blade withdrawal mechanism in correctly timed sequence synchronised with the travel of the support means along the predetermined path.

In one construction the support means includes rotatable mounting means for the fuel can so that it can be rotated about its longitudinal axis, and the machine includes indexing means for turning the fuel can through a predetermined angle about its longitudinal axis after the actuation of the withdrawal mechanism, to bring a subsequent pair of diametrically-opposed blades into alignment with the withdrawal mechanism for withdrawal thereby, the indexing means for rotating the fuel can being also operable in the required sequence by the control means.

Guide means leading to a vault or other depository may be incorporated in or associated with the machine, whereby splitter blades released by the withdrawal mechanism are guided to fall into the vault, which will be provided with suitable shielding against the radioactivity of the waste splitter blades accumulating in it.

Preferably the machine includes hydraulic compacting ram means in the vault, the ram means when actuated serving to compress the waste splitter blades in the vault into a compact mass of metal.

In a preferred form of the invention the indexing means, the cutter mechanism and the blade withdrawal mechanism are all hydraulically operated, and hydraulic jack means is provided to control movement of the support along its guided path along the rails. In this arrangement the control means is arranged to regulate the flow of hydraulic pressure fluid to and from the various mechanisms and the jacks to cause them to perform the desired sequence of operations in the removal of the splitter blades.

The movement of the support along its predetermined path may be continuous, but preferably the support is arranged to be halted at predetermined positions along the path whilst the cutter mechanism is actuated to sever successively the securing means associated with a pair of oppositely-disposed blades.

The cutting mechanism may conveniently comprise two pairs of cutting pincers each constructed and arranged to cut through two aligned securing straps respectively on opposite sides of a single splitter blade in a single pincer-closing operation, and the control mechanism is arranged to halt the support for the fuel can at a number of predetermined stations along the length of the path, each station corresponding to the location of one of the pairs of aligned straps, and to actuate one or each of the pincer devices to cut the associated straps during the halt at that station.

In a convenient arrangement the withdrawal means comprises two pairs of hydraulically-operated jaws respectively carried on two movable arms, and the arms can be moved hydraulically to cause movement of the jaws in inward and outward directions transverse to the longitudinal axis of the fuel can.

The invention may be carried into practice in various ways but one specific embodiment will now be described by way of example only, with reference to the accompanying drawings, in which:

FIGURE 1 is a side elevation of a machine for removing and compacting the splitter fins of a fuel can.

Figure 3:
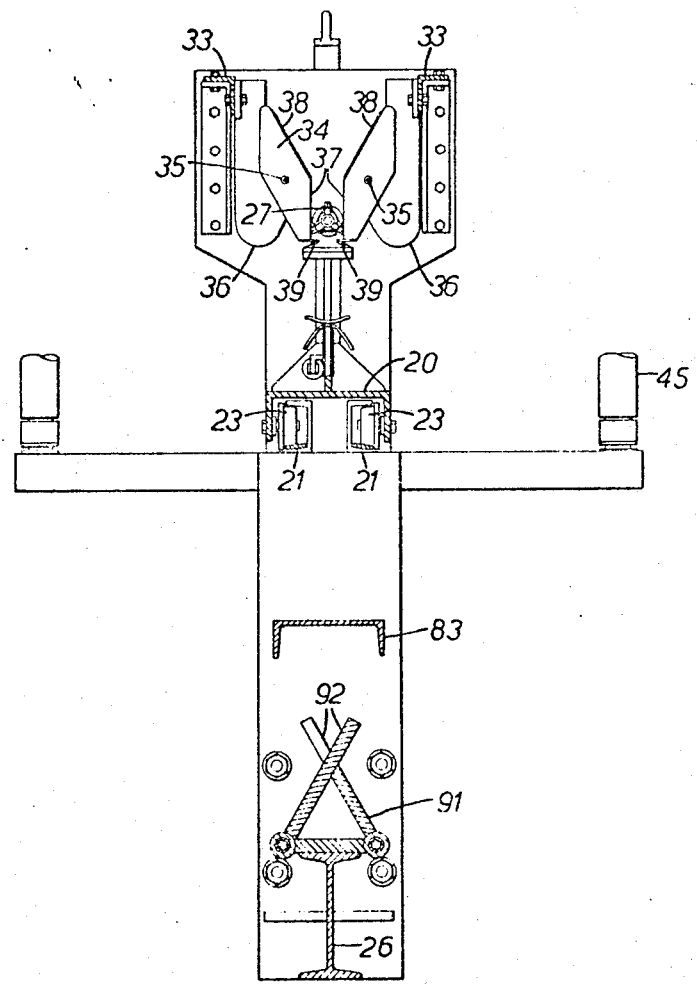
Figure 4:
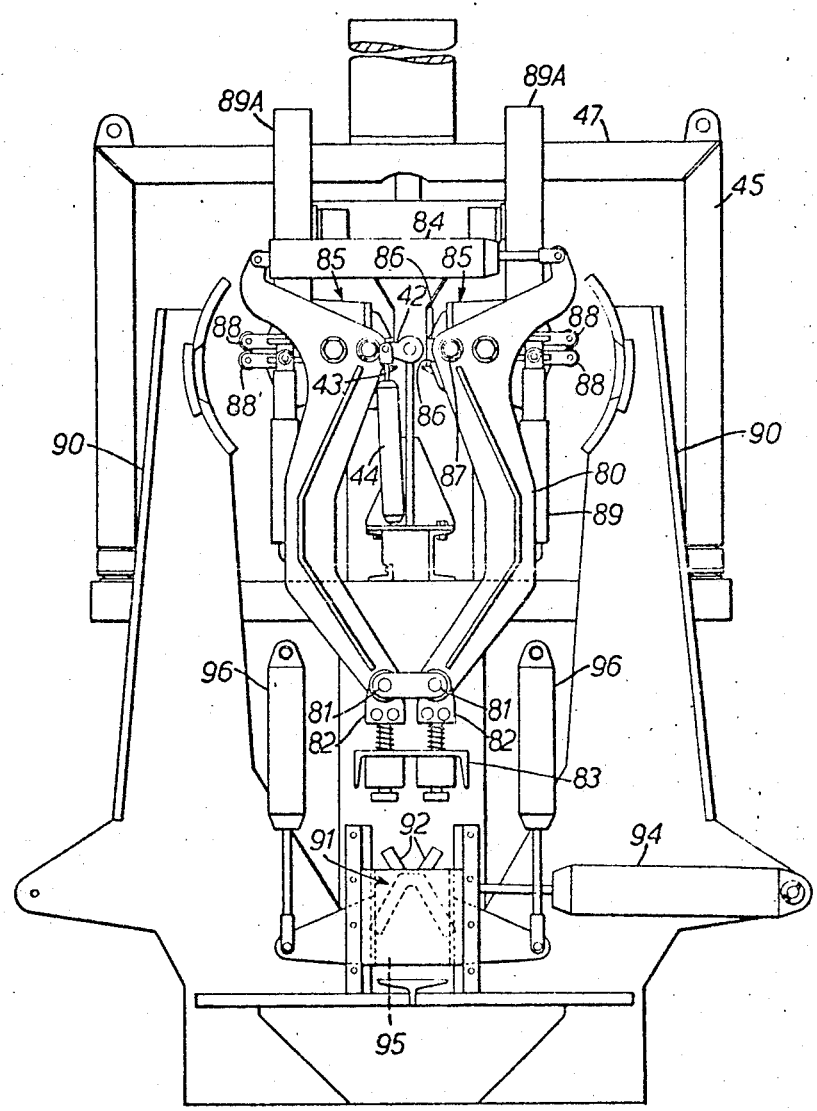
Figure 5:
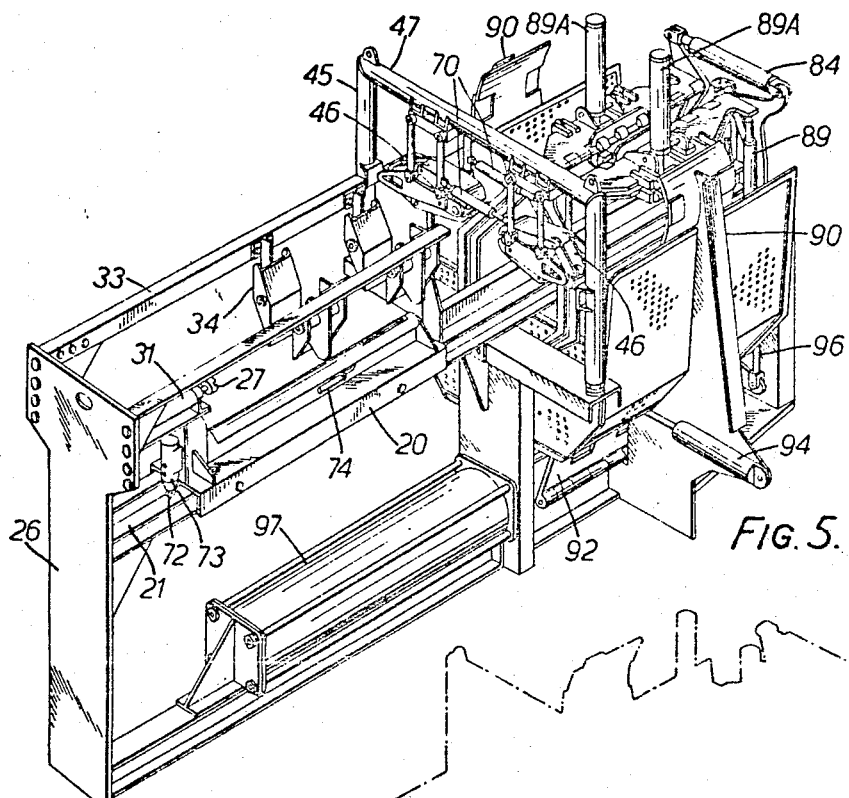
Figure 14:
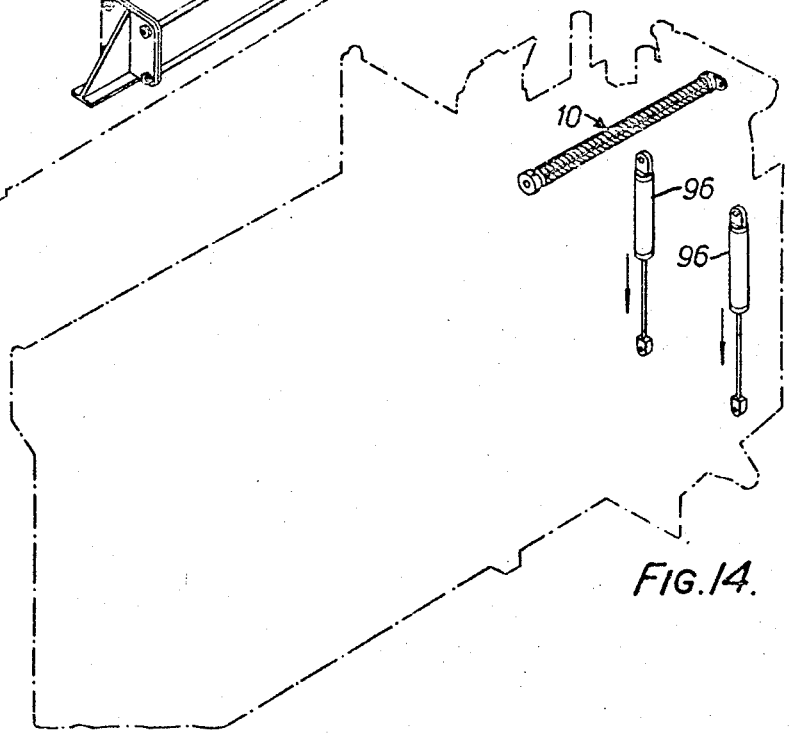
Figure 15:
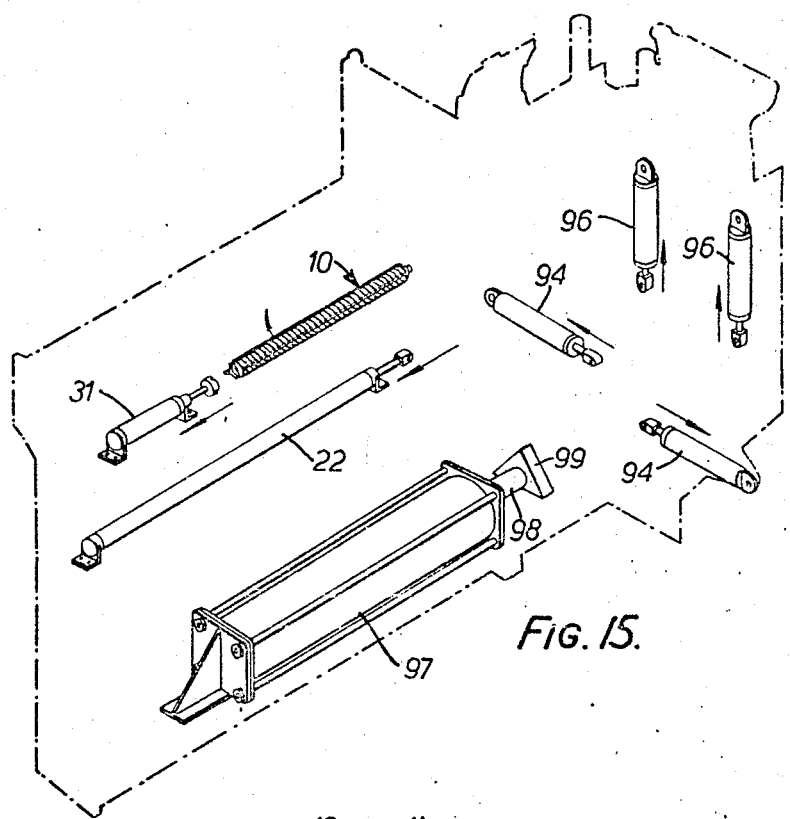
Figure 16:
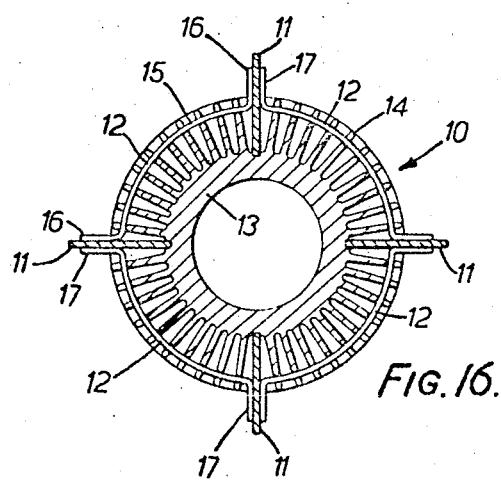
Figure 17:
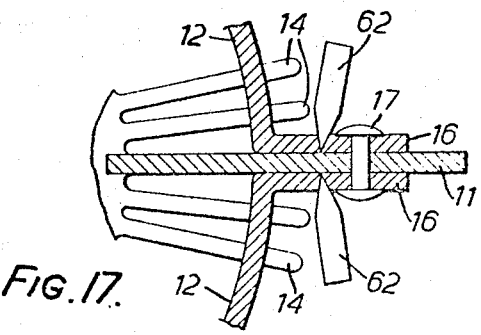
Figure 18:
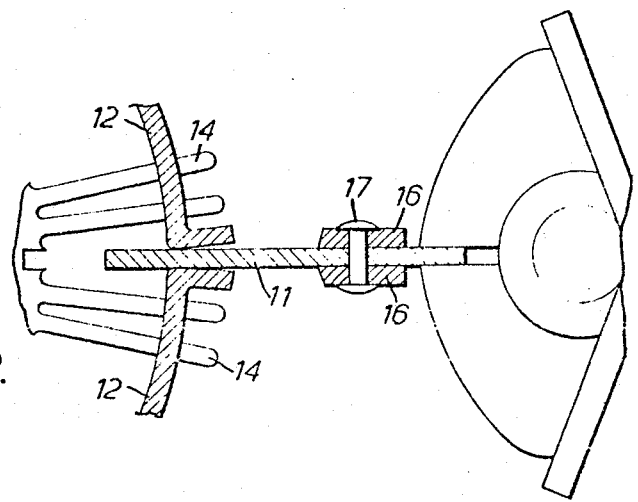
Figure 19:
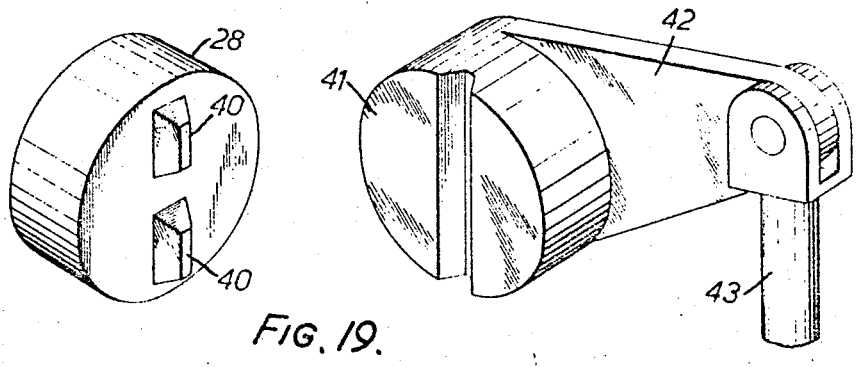
Figure 20:
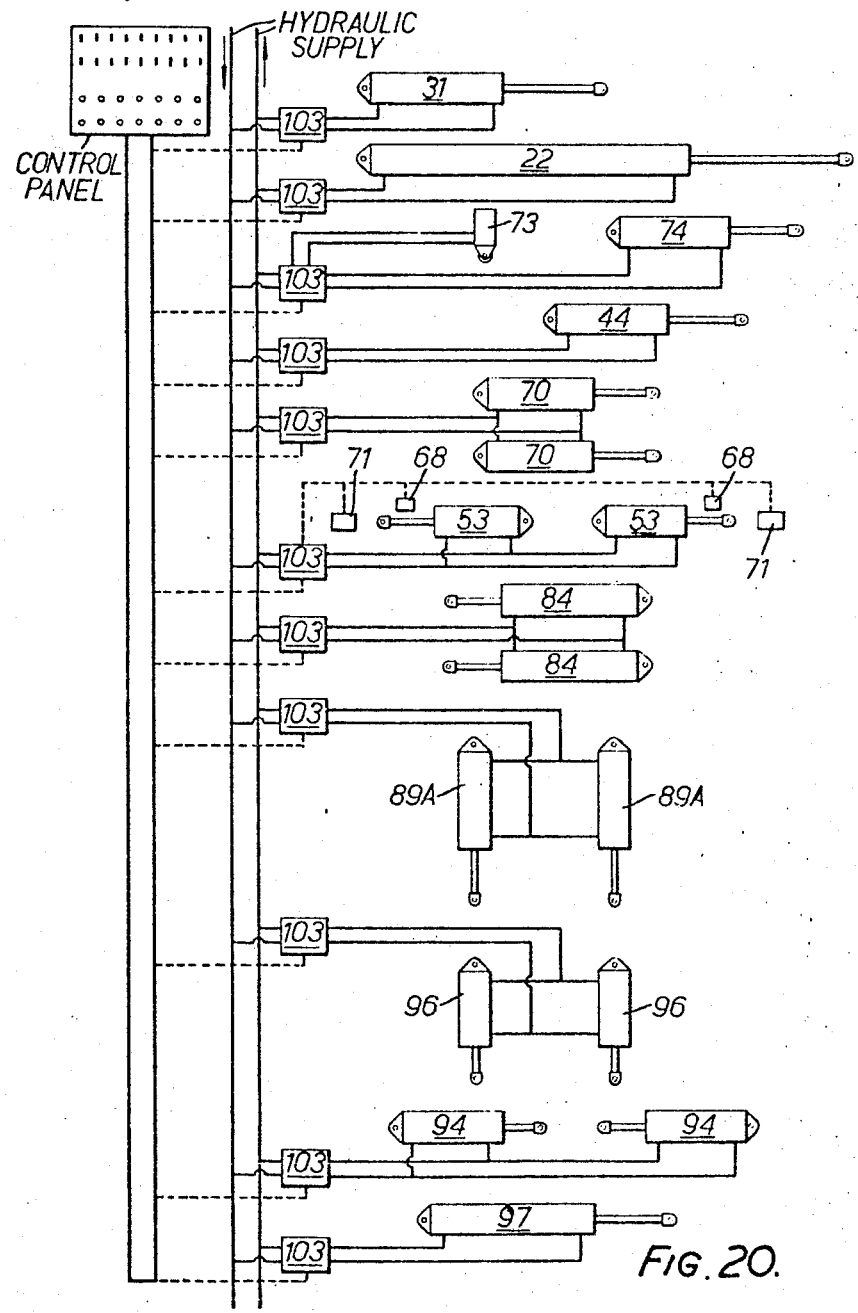

FIGURE 2 is a fragmentary view showing the blade-cutting mechanism and its supporting frame in elevation, FIGURE 2A is a detailed elevation of one of the blade cutting mechanisms of FIGURE 2, on an enlarged scale, FIGURE 3 is a cross-section on the line III—III of FIGURE 1, FIGURE 3A is a fragmentary view showing one of the guide plates of FIGURE 3, on an enlarged scale, FIGURE 4 is an end view of the machine as seen in the direction of the arrow IV in FIGURE 1, FIGURE 4A is a somewhat diagrammatic fragmentary end view showing the operating mechanism for one of the clamping jaws of FIGURE 4, on an enlarged scale, FIGURE 5 is an isometric view of the machine seen from the opposite end, FIGURES 6 to 15 are a series of diagrams illustrating successive stages in the operation of the machine, FIGURE 16 is a cross-section through a typical fuel can, FIGURE 17 is a fragmentary end view of the fuel can assembly, on an enlarged scale, showing the straps being cut, FIGURE 18 is a similar view showing a splitter blade being withdrawn, FIGURE 19 is a perspective view on an enlarged scale showing the dogs on the tailstock, and FIGURE 20 is a diagrammatic illustration of the control system.

In the illustrated embodiment, the machine is designed for removal of a splitter assembly from a fuel can 10 illustrated in FIGURE 16, the can 10 having a set of four radially-extending longitudinal splitter blades 11 secured together at right angles by means of five sets of four interconnecting straps 12, the straps 12 extending between adjacent splitter blades 11, and the five sets of straps 12 being spaced apart along the length of the can 10. As seen in FIGURE 16 the generally-cylindrical body 13 of the can 10 is formed with a set of integral radially-extending helical heat-exchange fins 14 of lesser radial height that the splitter blades 11, the inner edge of each spiltter blade 11 being let into a longitudinal recess formed in the fins 14 and extending into the body 13. Each of the straps 12 comprises an arcuate centre portion 15 which lies in a shallow recess machined locally in the tips of the heat-exchange fins 14 and extends circumferentially around a quarter of the exterior of the can 10, and is formed at each end with a pair of outwardly-bent lugs 16. The four straps 12 of each set are secured around the can 10 with their lugs 16 rivetted to the splitter blades 11 as indicated at 17. The straps are rivetted at the ends to the associated splitter blades and extend around the outside of the helical or circumferential cooling fins of the can.

The machine shown in FIGURES 1 to 6 includes a carriage 20 carried on guide rails 21 for movement along a straight horizontal path under the action of a hydraulic jack 22. The carriage 20 has wheels 23 which run on the guide rails 21. The jack 22 referred to as the carriage traverse jack, is mounted horizontally between the rails 21 and only the end portion of its jack cylinder is visible in FIGURE 1 being shown secured by a bracket 24 to a cross-plate 25 extending between the rails. The rails 21 are mounted in a main frame 26.

A used fuel can 10 to be de-splittered is mounted in the carriage 20 between centres afforded by rotatable head and tail-stocks 27 and 28 supported upon the carriage 20, and is arranged with its axis parallel to the guide rails 21. The tail-stock 28 is rotatably mounted upon a fixed support 29 on the forward end of the carriage 20, while the head stock 27 is rotatably carried by the plunger 30 of a hydraulic jack 31 mounted horizontally at the rear of the carriage 20. The jack 31 can be actuated to reduce the separation between the head and tail stocks 27 and 28 so as to clamp the fuel can 10 in position between their centres.

A sub-frame 33 mounted on the main frame 26 above the guide rails 21 supports two pairs of pivoted guide plates for orientating the fuel can correctly about its longitudinal axis when it is initially clamped between the head-stock and tail-stock 27 and 28. Each guide plate 34 is pivoted about a horizontal axis 35 parallel to the guide rails to a fixed supporting bracket 36 bolted to the sub-frame 33. The guide plates 34 are spring-loaded inwards towards each other by spring means 34A towards the position shown in FIGURES 3 and 3A in which their inwardly-facing lower edges 37 are parallel to one another and their inwardly-facing upper edges 38 converge towards one another in the downward direction. This position is determined by adjustable stops 34B. Each guide plate 34 carries a horizontal lip 39 at its lower part. Thus when a used fuel can is lowered by means of a remote-controlled manipulator into the space between the pairs of opposed guide plates 34 for clamping between the head-stock 27 and the tail-stock 28, the converging upper edges 38 of the opposed guide plates will guide the fuel can down into the space between the parallel lower edges 37 of the guide plates, until the tips of its lower splitter blades 11 engage on the horizontal lips 39 at the bottoms of the guide plates 34. The lips 39 are so positioned in relation to the clamping axis of the head-stock 27 and tail-stock 28 that when the axis of the used fuel can is in alignment with the clamping axis of the head-stock and tail-stock, the tips of its lower two splitter blades 11 will rest on the horizontal lips 39 and the fuel can 10 will have been turned thereby about its longitudinal axis into a correctly orientated position in which the four splitter blades 11 extend radially in planes at 45° to the horizontal.

When the carriage 20 is moved towards the right in FIGURE 1 to its extreme position in which the tail-stock is clear of the right-hand pair of guide plates 34, dogs 40 on the rear end of the shaft of the tail-stock 28 come into engagement with corresponding recesses in a boss 41 attached to a rotatable crank member 42 as seen in FIGURE 19. At its outer end the crank member 42 is pivotally connected to the forked upper end of the plunger 43 of an orientating jack 44 the lower end of whose casing is mounted on the main frame 26. The orientating jack 44 when actuated serves to turn the crank member 42, and with it the tail-stock 28 and the fuel can 10 clamped against the tail-stock 28, through 45°, thus bringing the two pairs of diametrically-opposed splitter blades of the fuel can 10 respectively into horizontal and vertical planes.

With the fuel can thus oriented by the jack 44, the carriage 20 is now traversed back towards the left-hand end of the main frame 26 in stages by the retraction of its traverse jack 22, to bring the sets of straps 12 located at spaced points of the length of the fuel can successively into position between the cutting blades of a hydraulic cutter mechanism, which is supported by a transverse intermediate frame 45 extending across the main frame 26 near the midpoint of its length. The hydraulic cutter mechanism supported by the intermediate frame 45 comprises a pair of opposed hydraulically-actuated pincer mechanisms each indicated generally at 46 and each pivotally suspended from the top member 47 of the frame 45 by means of a parallel-motion linkage comprising a pair of parallel suspension links 48, whose spaced upper ends are pivoted at 49 to a fixed beam 50 secured to the cross bar 47 and whose forked lower ends are pivoted at 51 to spaced points of a pair of spaced parallel apertured plates 52 which together constitute the movable lower member of the parallel linkage. Each pincer mechanism 46 comprises a double toggle linkage actuated by a hydraulic cutter jack 53, a portion of whose plunger is visible at 54 in FIGURE 2. The cutter jack 53 acts between pivot pins 55 and 56 at diagonally opposed points of the double toggle linkage, which is made up of two jaw levers 57 and two toggle levers 58. Adjacent ends of the toggle levers 58 are pivotally interconnected by the pin 56 and their other ends are pivotally connected at 59 to the tails 60 of the jaw levers 57, which are themselves journalled on the pin 55. The portions 61 of the jaw levers 57 which carry the cutter jaws 62 extend forwardly of the pivot pin 55, so that when the toggle mechanism is contracted by the retraction of the cutter jack 53, so that the intermediate pivot pins 59 and the tails 60 of the lever jaws 57 move away from one another, the opposed cutter jaws 62 will be moved towards one another to perform their cutting action on the straps 12 of a fuel can positioned between them. Similarly, the extension of the cutter jack 53 serves to open the jaws 62 after the cutting operation has been performed. A pair of parallel slotted beams 63 each secured at one end to the pin 55 extend on either side of the toggle linkage across its longer diagonal, the protruding ends of the pin 56 being sildingly engaged in the slots 64 of the beams 63 to allow the articulation of the toggle linkage. At their far ends the slotted beams 63 are interconnected by a cross piece 65. The toggle mechanism is pivotally supported by means of a pin 66 passing through aligned pivot holes in the beams 63 and secured at its ends in the apertured plates 52 which are located outside the slotted beams 63. The pivotal movement of the toggle linkage about its pivot pin 66 is limited by the profile of the aperture 67 in each of the apertured plates 52. As seen in FIGURE 2 each aperture 67 has a convergent outer end portion 67A terminating in a parallel-sided portion 67B in which the pin 56 is a snug fit when the cutter jack 53 is in its fully extended position. A micro-switch 68 is secured to one of the two apertured plates 52 and is engaged by the pin 56 sliding in the slot 64 when the cutter jack 53 is fully retracted, the micro-switch 68 when so operated being arranged to give a signal indicating that the jaws 62 have been fully opened.

A jaw positioning jack 70 extends between the two cutter mechanisms 46 and is pivotally secured at its two ends to their adjacent suspension links 48. The positioning jack 70 serves to move the cutter mechanisms 46, swinging them on the pairs of pivoted links 48 which support them. The position of extreme separation of the pincer mechanisms 46 is indicated by a pair of micro-switches 71 mounted on opposite sides of the frame 45 and each arranged to be engaged by the cross members 65 which joins the outer ends of the slotted beams 64 of the associated mechanism. When so actuated each micro-switch 71 gives a signal indicating that the associated pincer mechanism 46 has reached its extreme outer position.

Thus in operation the carriage 20 is traversed in successive stages through the transverse frame 45 from right to left as seen in FIGURE 1, halting at five successive positions in each of which one of the five sets of straps 12 is aligned with the cutter mechanism. During each halt period the jaw positioning jacks 70 are actuated to bring the two pincer mechanisms 46 towards one another on either side of the fuel can 10 so that its horizontally-extending splitter blades 11 and the strap lugs 16 rivetted to them enter between the pairs of opposed jaws 62, whilst the other pair of blades 11 extend vertically. It will be noted that the pivotal support of each pincer mechanism 46 allows it to accommodate itself to any irregularity in the positioning of the splitter blade whose straps are being cut, so that the blade even though slightly distorted can enter between the jaws 62 by causing the mechanism 46 to tilt slightly about the pin 55 as it is moved towards the cam by the positioning jack 70, this tilting movement of the mechanism 46 being limited by the engagement of the pin 56 in the aperture 67. When the positioning jack is fully contracted, each mechanism 46 will be guided into its properly aligned horizontal position by the entry of the pin 56 into the parallel-sided end portion 67B of the aperture 67. The two cutter jacks 53 are then actuated to cause the opposed pincer jaws 62 to close and cut through the lugs 16, but not to cut through the horizontal splitter blades 11, as shown in FIGURE 17. The cutter jacks 53 are then retracted to open the pincer jaws 62, and the positioning jack 70 is then extended to withdraw the pincer mechanisms 46 outwardly from the fuel can. The carriage is then traversed to the next position and the cutting operation is performed on the next set of straps.

When the carriage 20 reaches the position in which the cutter jaws are aligned with the fifth and last set of straps 12, the spring-loaded plunger 72 of a control valve 73 mounted on the left-hand end of the carriage 20 drops off the end of a cam plate 72A secured the top of one of the guide rails 21 and in so doing operates the valve 73 to cause it to actuate a splitter support jack 74 carried on one side of the carriage 20. The splitter support jack 74 is connected to an upwardly-extending U-shaped support member, of which only the lower end 75 is visible in FIGURE 1, but which is also clearly shown in FIGURE 3. When raised by the actuation of the jack 74 member 75 engages beneath the two horizontally-extending splitter blades 11 on either side of the fuel can and serves to support these splitter blades whilst the cutting operation is performed on the fifth and last set of straps 12, the preceding four sets of straps having already been severed.

When all five sets of straps 12 have been severed at the roots of one pair of diametrically-opposed splitter blades 11, the carriage 20 is moved once again to its extreme right-hand position in FIGURE 1 for the removal of the severed blades. For this purpose a hydraulically-actuated blade withdrawal mechanism illustrated particularly in FIGURE 4 is employed. The blade withdrawal mechanism comprises two pairs of upwardly extending cranked arms 80, the lower end of one arm 80 of each pair being supported at 81 on one of a pair of elongated supporting blocks 82 mounted resiliently on a fixed longitudinal member 83 of the main frame 26. The two pairs of arms 80 are spaced apart longitudinally along the supporting member 83, and a splitter removal jack 84 is connected between the spaced upper ends of each pair of arms 80. Two pairs of clamping jaws each generally indicated at 85 are provided, each pair of clamping jaws 85 being carried by and extending between one arm 80 of each pair on the corresponding side of the machine. The clamping jaws 85 have elongated lips 86 pivoted about an elongated pivot rod 87 extending between and carried by the two supporting arms 80, and tail strips 88 secured to the jaw members 86 extend outwardly from the pivot rod 87. A spring-loaded plunger 89 is connected between each of the upper jaw tail strips 88 and a point on the respective arm 80 and thus provides a resilient centering effect tending to locate the jaws approximately horizontally. A double-acting hydraulic jack 89A is provided for separating the tailstrips 88 and thus opening the jaws 86 and vice versa.

Thus when the carriage 20 supporting the fuel can 10 with one pair of splitter blades 11 severed is moved into position between the separated arms 80, the jaw positioning jacks 84 can be retracted to bring the arms 80 towards one another so that the separated clamping jaw lips 86 move into position respectively above and below the two horizontal splitter blades 11 of the fuel can, the clamping jacks 89A being at that time retracted to hold the clamping jaws 86 apart. The jacks 89A are then extended to cause the jaws to clamp onto the two horizontal splitter blades 11, and with the jaws still clamped the positioning jacks 84 are actuated to separate the pivoted arms 80 and thus to cause the two horizontally-extending severed blades 11 to be withdrawn outwardly from the body 13 of the fuel can by virtue of the fact that the straps 12 have previously been severed at the roots of the horizontal splitter blades. This withdrawal operation is illustrated in FIGURE 18. The clamping jacks 89A can then be retracted again to open the jaws 86 and allow the withdrawn splitter blades to fall between fixed guide members 90 into a crushing box 91 mounted at the bottom of the machine.

After the withdrawal of the first pair of splitter blades 11, the fuel can is rotated through 90° by actuation of the orientating jack 44 to bring the remaining pair of splitter blades 11, to which the remaining portions of the severed straps 12 are still rivetted, into the horizontal position in which they are then withdawn from the fuel can body 13 by means of the clamping jaws 85 and withdrawal jacks 84 in the manner described above.

The longitudinal side walls of the crusher box 91 are afforded by a pair of co-operating pivoted flaps 92 whose upper ends are formed with alternating and inter engaging projections and slots, and which can be moved pivotally towards one another into inwardly-inclined positions by means of a pair of horizontally-acting crusher box closure jacks 94, one of which only is shown in FIGURE 4. The crusher box 91 is provided at its outer end with a vertically-sliding gate 95 operated by a pair of vertically-acting jacks 96, and a horizontally-acting hydraulic crusher ram 97 is mounted on the bottom of the main frame 26 with its plunger 98 extending into the other end of the crusher box 91. The crusher ram plunger 98 carries at its outer end a triangular piston 99 shaped to slide between the inwardly inclined side flaps 92 of the crusher box when they are moved into their closed positions by their associated jacks 94.

The machine is provided with a manually-operated control system illustrated diagrammatically in FIGURE 19 whereby the various stages of the complete cycle can be initiated and controlled manually by an operator with the assistance of indicating signals and indirect visual observation through appropriate optical viewing systems. Thus there is provided a control panel on which are mounted manually operable controls for actuating and retracting the various hydraulic jacks to perform their required functions, together with a system of indicating lamps which are arranged to indicate to the operator the instant at which each particular stage or step of the operating cycle has been fully completed before the operator actuates the control to initiate the next succeeding stage or step. The control panel 100 has individual electrical connections with solenoid-actuated valves 103 controlling the flow of hydraulic fluid to the individual jacks, and also has connections to the microswitches such as 68 and 71, which cause illumination of the appropriate indicating lamps 102 when each stage or step has been completed.

FIGURES 6 to 16 are a series of diagrams indicating the successive stages of the complete operating cycle of the machine described and illustrated in FIGURES 1 to 5. The cycle will now be briefly described with reference to these figures.

Figure 6:
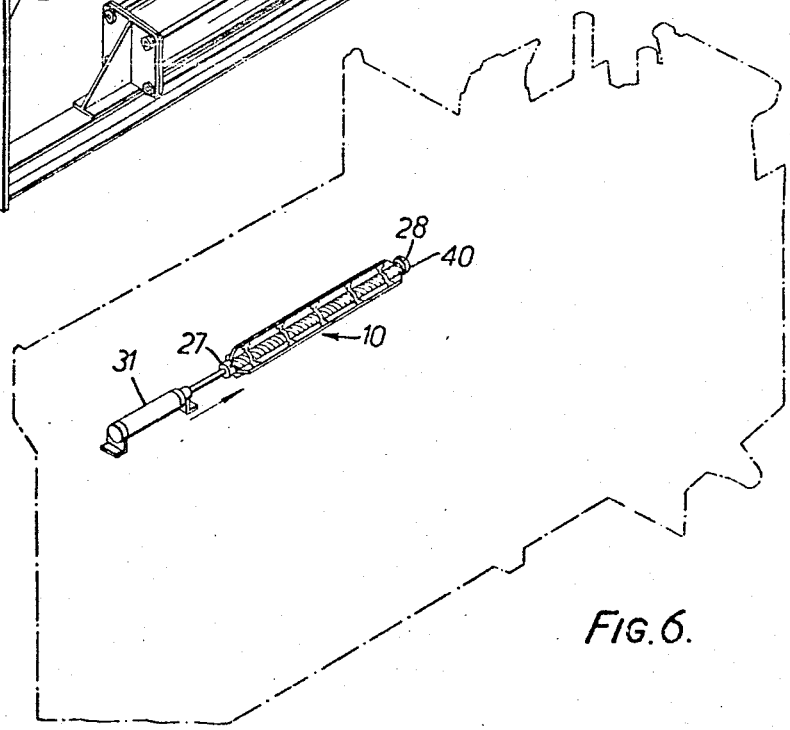
Figure 7:
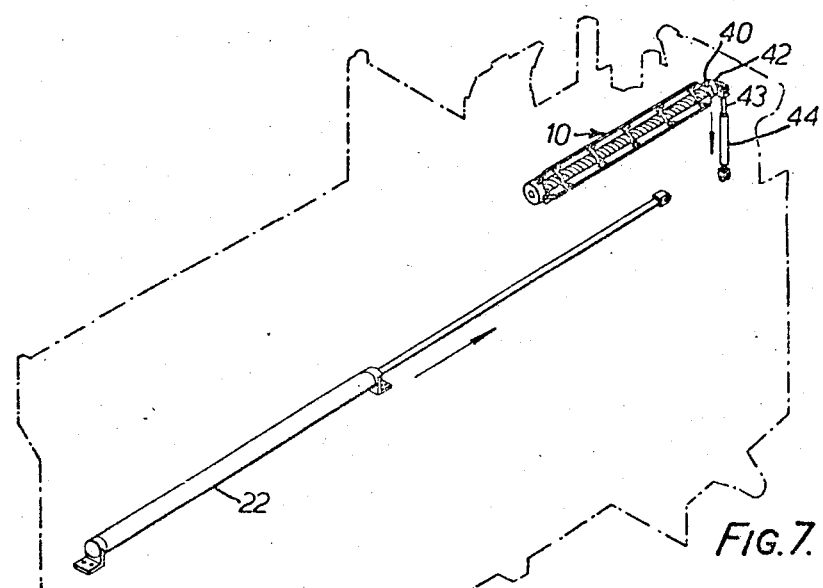

Firstly, with the carriage traversing jack 22 retracted a used fuel can is dropped by a manipulator into the cradle constituted by the spring-loaded guide plates 34 and is clamped between the head stock 27 and tail stock 28 by the actuation of the jack 31, as indicated in FIGURE 6. The traversing jack 22 is then actuated to traverse the carriage to its fullest extent beyond the cutting frame 45, so that the dogs 40 of the tail-stock 28 engage in the locating recesses in boss 41 associated with the orientation jack 44. The orientation jack 44 is retracted to rotate the fuel can through 45°, so that its splitter fins extend radially in horizontal and vertical planes. The position is now as shown in FIGURE 7.

Figure 8:
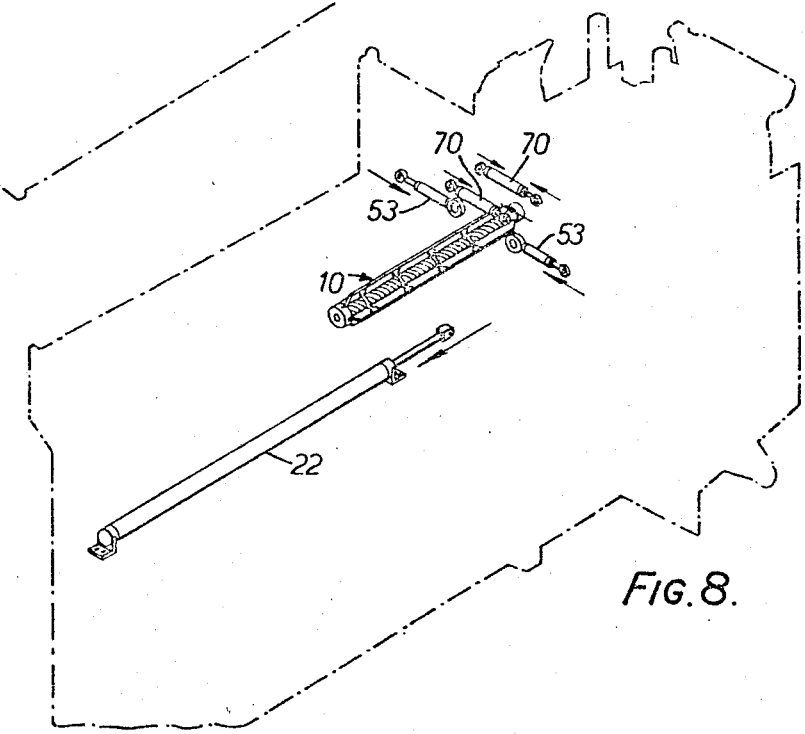

The traversing jack 22 is then actuated to return the carriage until the first cutting position is reached, as indicated in FIGURE 8, and the pincer positioning jacks 70 are retracted to bring the cutting pincers into their operative positions, following which the cutter jacks 53 are retracted to cause the pincer jaws 62 to close and sever the straps.

Figures 9, 10:
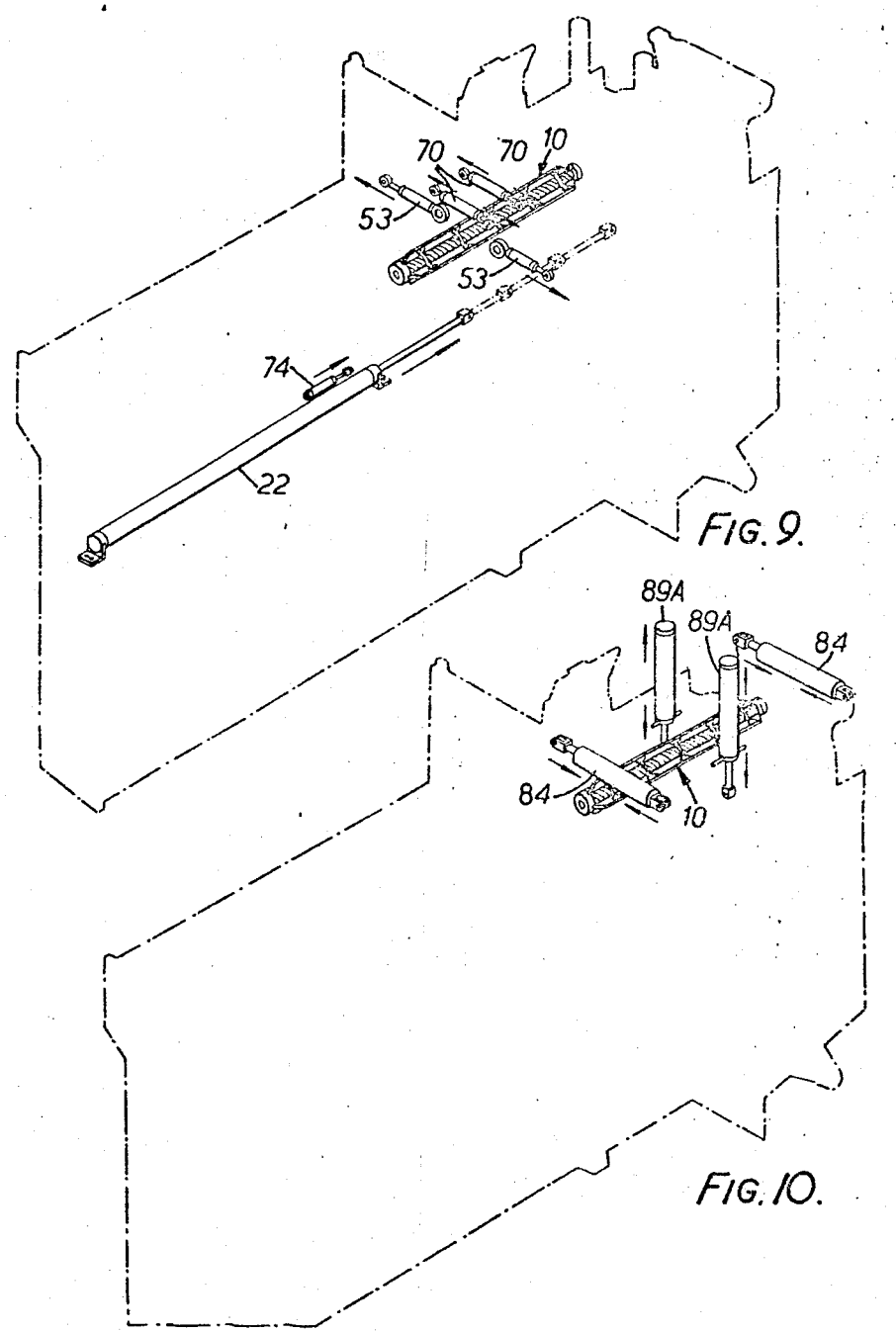

As indicated in FIGURE 9 the cutter jacks 53 are then extended to open the pincer jaws and the positioning jacks 70 are extended to withdraw the pincer mechanisms from the fuel can. The carriage is then traversed successively to the second, third, fourth and fifth positions in each of which the cutting operation described above is repeated. When the carriage moves into the fifth position and before the fifth cutting operation is performed, the splitter supporting jack 74 is automatically actuated, to raise the splitter support beneath the horizontally-extending splitter blades 11 so as to support them firmly during the fifth cutting operation. After the fifth cutting operation has been completed the jack 22 is extended completely to traverse the carriage back to its extreme position to couple the dogs 40 to the crank 42 associated with the orientation jack 44.

Figure 11:
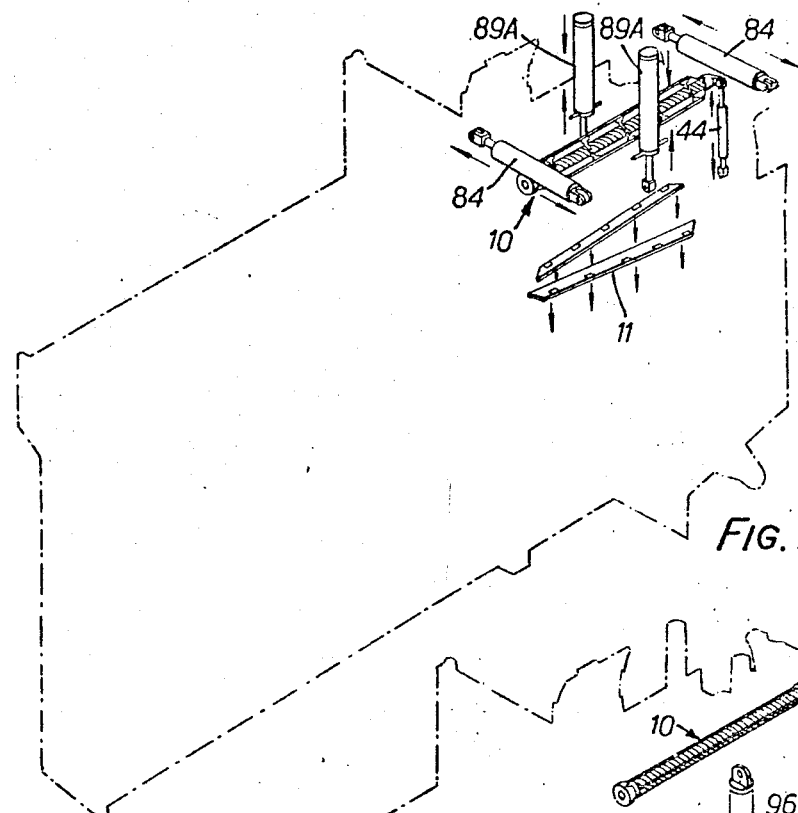

Referring now to FIGURE 10, the splitter removal jacks 84 are now retracted to swing the splitter removal arms 80 inwardly on either side of the fuel can, the clamping jacks 89A being at that time retracted to hold the clamping jaws 85 open. The clamping jacks 89A are then extended to allow the jaws 85 to be clamped resiliently on to the horizontal splitter blades 11 under the force of the spring plungers 89, and the withdrawal jacks 84 are extended to cause the two horizontal splitter blades 11 to be withdrawn from the body of the fuel can by the jaws 85. The jaw clamping jacks 89A are then retracted to open the jaws and to allow the first pair of splitter blades 11 to be jettisoned, as indicated in FIGURE 11. The fuel element is now rotated through 90° by means of the orientation jack 44 and the other two splitter blades 11, which are now horizontal, are withdrawn by the process previously described and are jettisoned. The hydraulic pressure on the orientation jack 44 can now be released.

Figure 12:
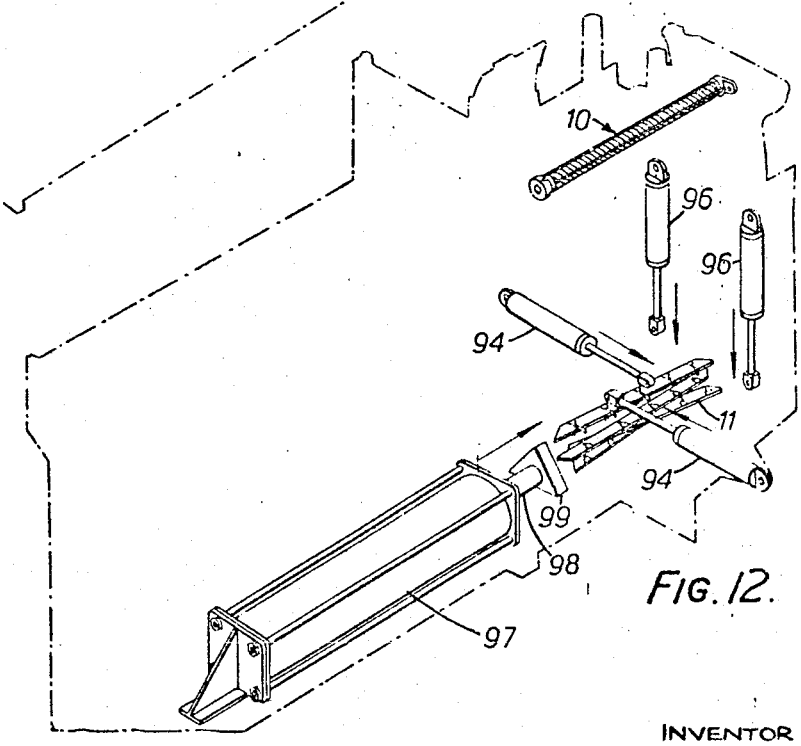

Referring now to FIGURE 12, after a brief period the flaps 92 of the crushing box 91 are closed by the actuation of the flap jacks 94, and the gate 95 is closed by the extension of its jacks 96. The crushing ram 97 is now energised to crush and compress the jettisoned blades 11 in the crushing box into a compact mass of metal, the crushing stroke being continued until the ram 97 stalls.

Figure 13:
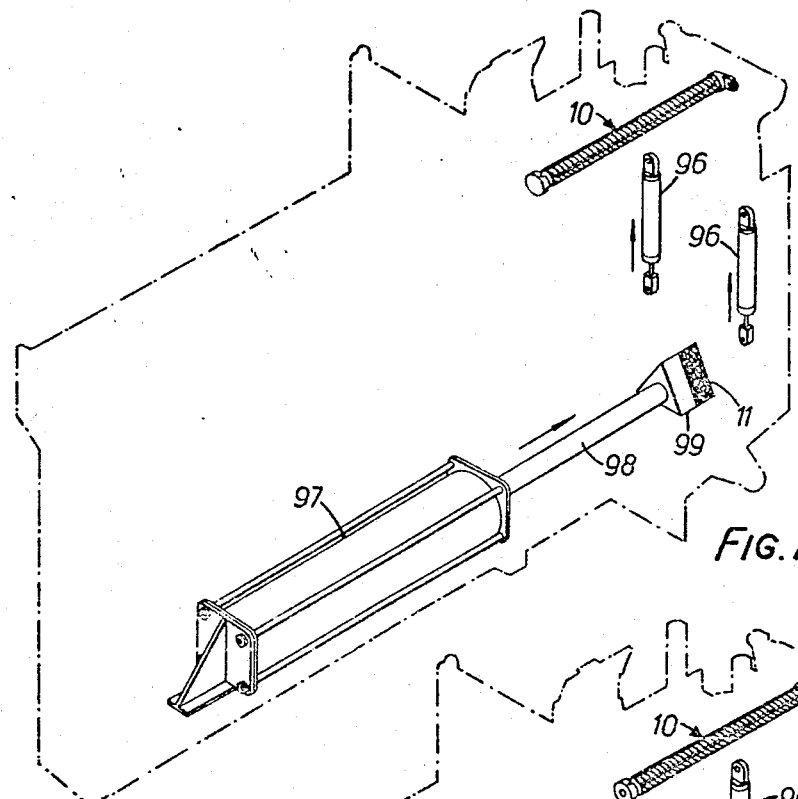

Referring now to FIGURE 13, the hydraulic pressure of the crushing ram 97 is released, and the crushing box gate 95 is opened by means of the jacks 96. The extension stroke of the ram 97 is now continued at a reduced pressure to the maximum extension of the ram, to push the compacted mass of metal out of the crushing box from which it falls into a storage basket.

As indicated in FIGURES 14 and 15 the crushing ram is retracted and the gate closed. The carriage 20 is returned by the traversing jack 22 and the clamping jack 31 is retracted to allow the stripped fuel can to be removed by means of a manipulator.

What I claim as my invention and desire to secure by Letter Patent is:

1. A machine for stripping splitter blades from a nuclear reactor fuel can assembly, said blades extending longitudinally of the can and generally radially outwardly therefrom, and secured to the can by at least one strap which extends substantially circumferentially around said can and blade assembly, and which has end portions extending radially of the can, said machine comprising: a can assembly support carriage; means for angularly orienting said can assembly about its longitudinal axis relative to said carriage; power operated cutting means adjacent said carriage adapted to sever the radial portions of said strap to free at least one splitter blade; power-operated blade withdrawal means adapted to grip the freed splitter blade and withdraw it radially from said can assembly; and means to relatively position said can assembly, said cutting means and said blade withdrawal means; and remote control means for sequentially controlling the operation of the machine whereby the splitter blades may be removed by a remotely controlled sequence of operations.

2. A machine as claimed in claim 1, in which the blade withdrawal means comprises two pairs of hydraulically operated jaws respectively carried on two pivotally movable arms, and hydraulic withdrawal means acting on the arms to pivot them in inward and outward directions transverse to the longitudinal axis of the fuel can assembly.

3. Apparatus as claimed in claim 1, including a track along which said carriage is adapted to transport said can assembly to permit successive severance of a plurality of said circumferentially extending straps spaced apart longitudinally of the can, to free a pair of splitter blades diametrically arranged on the can, said blade withdrawal means comprising two pairs of clamping jaws positioned on opposite sides of said track and adapted to grip said pair of blades simultaneously, and effect simultaneous radial disassembly movement of said pair of blades.

4. A machine as claimed in claim 3, in which the cutting means comprises two pairs of cutting pincers positioned on opposite sides of said track and each constructed and arranged, in a single pincer closing operation, to cut through two aligned radial strap end portions lying respectively on opposite sides of a single splitter blade, without severing said splitter blade, the two pairs of cutting pincers being disposed in opposed relationship for cutting operations on two-diametrically opposed splitter blades.

5. A machine as claimed in claim 3, in which the carriage is guided for longitudinal movement along the track within the machine and in which said cutting means and said blade withdrawal means are spaced apart from one another at separate stations along said track.

6. A machine as claimed in claim 3, in which the carriage includes rotatable mounting means for the fuel can, which permits the rotation of the fuel can about its longitudinal axis, and power-operated rotary indexing means for turning the fuel can through a predetermined angle about its longitudinal axis.

7. A machine as claimed in claim 6, in which the indexing means is operable to turn the fuel can firstly through an angle of 45 degrees in one direction and then through an angle of 90 degrees in the reverse direction.

8. A machine as claimed in claim 6, including guide means mounted on the carriage and adapted to engage the edges of the splitter blades of a fuel can assembly as said assembly is lowered onto said carriage, whereby the fuel can assembly is initially oriented angularly about its longitudinal axis into a predetermined angular position.

9. A machine as claimed in claim 6, in which the indexing means, the cutting means and the blade withdrawal means are all hydraulically operated, and which includes hydraulic jack means for traversing the carriage along its guided path.

10. A machine as claimed in claim 9, including control means arranged to halt the support at predetermined stations along its path corresponding to the locations of the straps which are required to be severed by the cutter mechanism.

References Cited by the Examiner
UNITED STATES PATENTS

| | | | |
|---|---|---|---|
| 801,963 | 10/1905 | Beaty. | |
| 1,175,697 | 3/1916 | Braun. | |
| 1,597,921 | 8/1926 | Okins | 29—200 |
| 2,932,244 | 4/1960 | Moyer | 100—39 |
| 2,977,718 | 4/1961 | Dahlman | 83—600 |
| 3,129,498 | 4/1964 | Runnels | 29—200 |
| 3,141,401 | 7/1964 | Lindemann et al. | 100—98 |

JOHN F. CAMPBELL, *Primary Examiner.*

THOMAS H. EAGER, B. L. WILHITE, *Examiners.*